Figure 1:
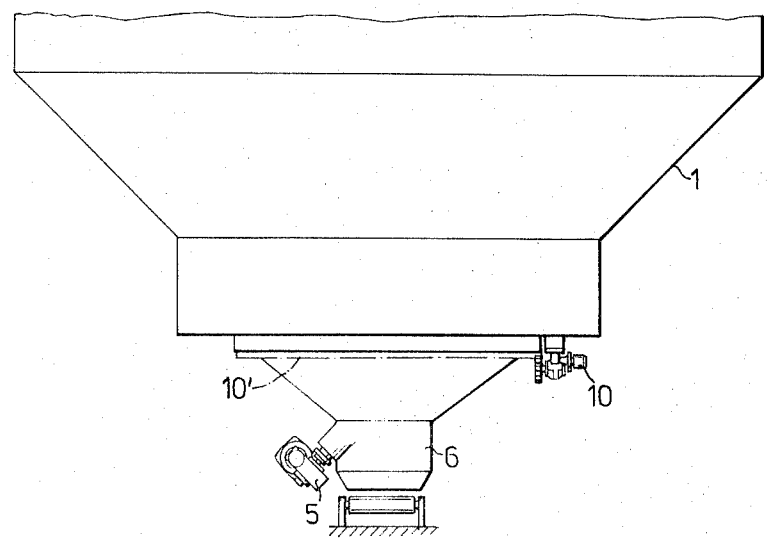

United States Patent [19]
Gustafsson

[11] 3,820,672
[45] June 28, 1974

[54] DEVICE FOR DISCHARGING MATERIAL FROM A SILO

[75] Inventor: Stig Ove Gustafsson, Karlstad, Sweden

[73] Assignee: C. J. Wennberg AB, Karlstad, Sweden

[22] Filed: Jan. 23, 1973

[21] Appl. No.: 326,105

[30] Foreign Application Priority Data
Feb. 3, 1972   Sweden............................ 1274/72

[52] U.S. Cl............................................ 214/17 DA
[51] Int. Cl............................................. B65g 65/46
[58] Field of Search................................ 214/17 DA

[56] References Cited
UNITED STATES PATENTS
3,259,538   7/1966   Schnyder....................... 214/17 DA
FOREIGN PATENTS OR APPLICATIONS
1,207,287   12/1965   Germany....................... 214/17 DA Primary Examiner—Robert G. Sheridan
Attorney, Agent, or Firm—Young & Thompson

[57] ABSTRACT

The invention relates to a device for discharging material from a silo at its lower end, the silo having a funnel-shaped bottom for wood chip, pulverulent materials and the like and the discharging device consisting of a conveyor screw placed above the silo bottom, which screw is both rotatable about its longitudinal axis and journaled in a revolving ring by upper and lower bearings, whereby the screw can receive a reciprocating or rotational sweeping motion over the silo bottom. The revolving ring supports an annular part on which the material is to be moved towards the bottom opening, said annular part being rotatably mounted relative to the revolving ring so as to prevent the material inside the upper bearing of the screw from taking part in or counteracting the sweeping motion of the screw.

5 Claims, 2 Drawing Figures

DEVICE FOR DISCHARGING MATERIAL FROM A SILO

This invention relates to a device for discharging material from the lower part of a silo having a funnel-shaped bottom for bulk mass such as wood chip, shaving, fodder material and the like and consisting of a specially shaped silo bottom and a screw mounted above said bottom, which upon rotation about its longitudinal axis feeds material inwards towards the center of the silo and simultaneously receives a reciprocating or rotating sweeping motion over the bottom surface of the silo so as to disrupt any tendency of bridging within the material. The discharging device according to the invention makes it possible to use considerably longer screws than in previously known devices and simultaneously to reduce the friction between the discharged material and the parts of the device.

Discharging devices with screws are previously known, e.g. from Swedish Pat. No. 324,997. The screw is there supported by two bearings fastened onto a discharge chute. The sweeping motion of the screw above the silo bottom is obtained by rotating the chute. For materials which are difficult to discharge and in which the screw must extend to the periphery of the silo to counteract bridging, the possible side diameter of the largest allowable overhang of the screw outside the upper bearing is limited. Silos have been built with diameters up to 4 meters and with supporting wheels at the upper end of the screw up to 6 meters.

In order to attain larger silo diameters, the space between the two bearings for the screw must be increased. This can be solved by placing the upper bearing onto the inner portion of the funnel-shaped bottom which is formed so as to be a part of the chute and to participate in its rotating motion. However, this movable bottom surface is submitted to the full pressure of the material which provokes a friction couple which considerably increases with the spacing of the bearings and must be surmounted by the driving means. In order to reduce the friction couple an annular portion, according to the invention, is arranged between the upper bearing of the screw and the chute with the purpose of taking up the pressure of the material within this zone. The annular portion is rotatably suspended relative to the other parts of the discharging device and therefore does not participate in the sweeping motion of the screw. Thereby the sliding friction between the material and the annular portion is replaced by the considerably inferior friction in the rotatable suspension.

It is advantageous that the parts subjected to the silo pressure of the material and participating in the sweeping motion have a loaded surface which is as small as possible. For this purpose the invention has been further developed with the possibility to provide a roof above the annular portion and radially outside the mounting of the upper bearing of the screw.

The silo pressure is always acting around the annular surface contacted by the upper bearing mount. For materials with an inner friction the silo pressure on inclined surfaces is less than that acting on horizontal surfaces. For this reason a further development of the invention has been made which consists in that the upper bearing mount is placed against an annular surface on the casing of the screw bearing, said surface having an inclination of 60° or less relative to the vertical axis of the silo.

With these arrangements the above related difficulties with the earlier known structures are avoided, whereby the range of diameters of the silo can be increased to 6–10 meters, which is usual for silo batteries, though without necessitating supporting wheels at the end of the screw.

Figure 2:
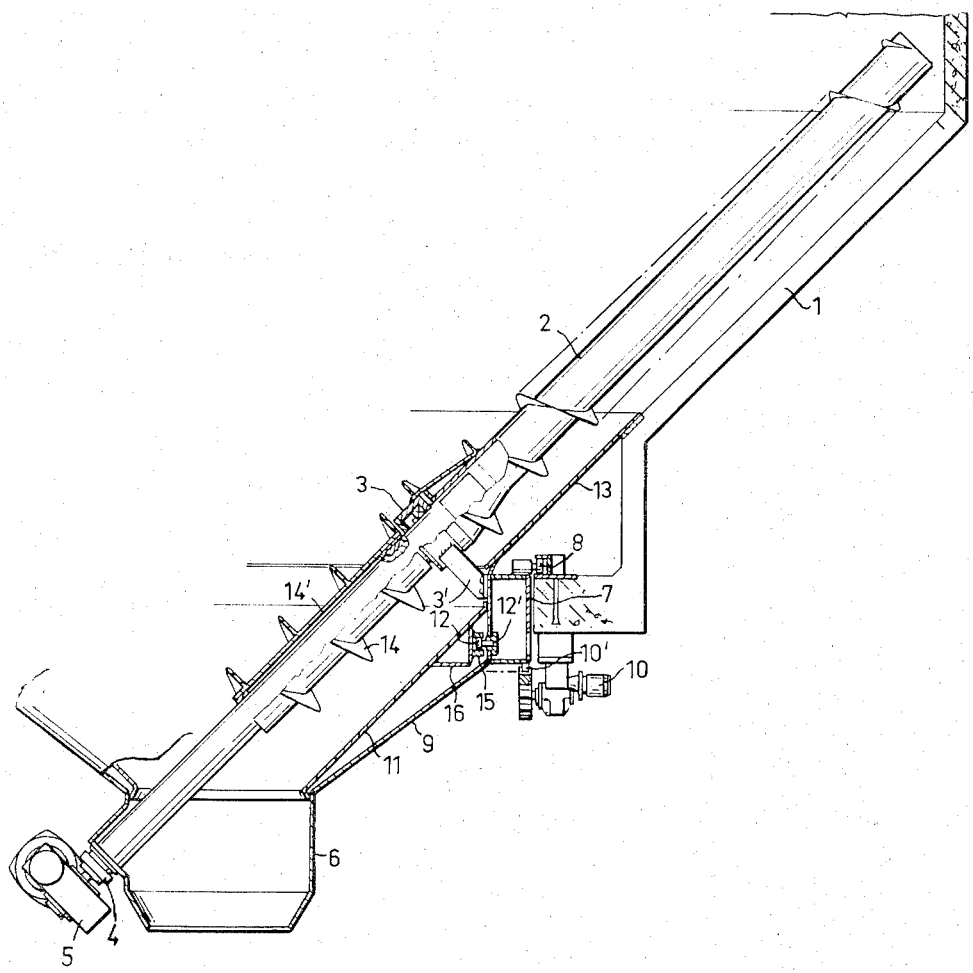

An embodiment of the invention is illustrated in the accompanying drawings in which FIG. 1 is an elevation of the bottom portion of a silo equipped with a device according to the invention, and FIG. 2 is an axial section on an enlarged scale of the part of the silo in which the device is mounted, only part of the device being shown in an axial section.

A screw 2 is sweeping over the conical silo bottom and is supported by upper and lower bearings 3 and 4, respectively. The screw is rotated about its longitudional axis by an optional driving mechanism 5, whereby the contents of the silo are fed downwards into a chute 6 placed above a conveyor. The bearing 3 is mounted onto and by means of a support 3' fixedly connected with a ring 7 which is rotatably suspended in a plane portion of the fixed bottom of the silo by means of rollers 8. Another set of rollers may guide the ring 7 radially. The bearing 4 is fixedly mounted in the chute 6. The chute 6 and the ring 7 are connected with each other by a jacket 9 which together with these parts forms a revolving ring which imparts the sweeping motion to the screw. The jacket can also be replaced by crossed beams. The revolving ring can be driven by any optional driving means 10, e.g. over a gear ring 10' fixed within the ring 7. In order to reduce the pressure of the material and the sliding friction on the jacket 9 caused thereby, a funnel-shaped part 11 is mounted between the ring 7 and the chute 6. The funnel is rotatably suspended in rollers 12 which are rotatably mounted on pins 12' fixedly mounted into the ring 7. The rollers run within a U-shaped guide rail 15 mounted onto a projection 16 on the part 11. Another set of rollers may guide the funnel radially. The ring 7 is surmounted by a roof 13 fixedly mounted on the silo bottom. This protects the upper side of the ring against the pressure of the silo material. The inwards facing side of the ring is vertical in order to reduce sliding friction against the ring surface.

When materials are concerned which are difficult to feed, the screw shaft below the bearing 3 should be provided with loosening members such as pins, shovels or, as shown in the drawing, with a helical wing 14 so as to facilitate the feeding of the material down the chute. The invention has been further developed with the possibility of mounting these members removably so as to simplify the exchange of bearings 3. Therefore the helical wing 14 is formed on a removable tubular sleeve 14', it being desirable to avoid joints on the screw near the bearing since this part is the most loaded portion of the screw.

The operation of the device is in short as follows: When the driving means 10 is active, the revolving ring formed by the ring 7, the jacket 9 and the slide 6 is rotated, the rollers 8 running on the underlying guide rail 15. The screw 2 is then sweeping around over the inclined bottom 1 of the silo. If the driving mechanism 5 also works, the screw is simultaneously rotated about its own axis. The ring or funnel 11 does not participate in the sweeping motion but due to the suspension by the rollers 12 can remain unmoved, whereby the upper border of the funnel, where a lip seal can be provided, slides against the inside of the ring 7.

The invention must of course not be considered as restricted to the embodiment illustrated in the drawings but can be modified in different ways within the scope of the following claims. The suspending and driving means can be arranged in different manners. The intermediate part 11 need not necessarily be funnel-shaped. Other shapes, e.g. formed of a plate, a combination of a plate and a cylinder, or of a cone and a cylinder may also be used. The inclination of the screw relative to the vertical direction can also be varied to fit different silo constructions.

What I claim is:

1. In a device for discharging material comprising a silo having a funnel-shaped bottom, a conveyor screw above the silo bottom, means mounting the conveyor screw for rotation about its longitudinal axis and for bodily revolution in the silo, said mounting means comprising upper and lower bearings and a revolving ring to which at least one of said bearings is secured, whereby the screw sweeps the silo bottom; the improvement comprising an annular part on which material moves toward the silo bottom, and means mounting said annular part on and for rotation relative to said ring so as to prevent material inside said upper bearing from taking part in or counteracting said sweeping motion.

2. A device as claimed in claim 1, and an annular roof fixedly mounted on the silo and overlying said ring.

3. A device as claimed in claim 1, said annular part being inclined at an angle not more than 60° from the vertical.

4. A device as claimed in claim 1, said screw comprising a shaft and removable flights on said shaft.

5. A device as claimed in claim 1, said annular part being funnel-shaped and having an upper opening ridge cooperating by a lip seal with an inner surrounding surface of said ring and a lower outlet opening engaging a downwardly extending chute that rotates with said ring.

* * * * *